United States Patent
Cornay (10) Patent No.: US 11,280,386 B1
(45) Date of Patent: Mar. 22, 2022

(54) INTERLOCKING STRAP HOOKS WITH FLEXIBLE ELONGATED MEMBER ATTACHMENT MEANS

(71) Applicant: BOLDER PRODUCTS, LLC, Longmont, CO (US)

(72) Inventor: Paul J. Cornay, Longmont, CO (US)

(73) Assignee: BOLDER PRODUCTS, LLC, Longmont, CO (US)

( * ) Notice: Subject to any disclaimer, the term of this patent is extended or adjusted under 35 U.S.C. 154(b) by 0 days.

(21) Appl. No.: 16/943,749

(22) Filed: Jul. 30, 2020

Related U.S. Application Data (60) Provisional application No. 62/880,392, filed on Jul. 30, 2019.

(51) Int. Cl.
*F16G 11/14* (2006.01)
*F16B 45/00* (2006.01)
*B60P 7/08* (2006.01)

(52) U.S. Cl.
CPC .............. *F16G 11/14* (2013.01); *F16B 45/00* (2013.01); *B60P 7/0823* (2013.01)

(58) Field of Classification Search
CPC ......... F16G 11/14; F16B 45/00; B60P 7/0823
See application file for complete search history.

(56) References Cited

U.S. PATENT DOCUMENTS

| | | |
|---|---|---|
| D92,798 S | 7/1934 | Furtsch |
| 2,447,422 A | 8/1948 | Nelson |
| 4,432,121 A * | 2/1984 | Dupre .................. F16B 45/00 24/343 |
| 4,622,724 A * | 11/1986 | Dupre .................. F16B 45/00 24/130 |
| D307,705 S | 5/1990 | Mair |
| 4,957,259 A | 9/1990 | Wolf, Jr. |
| 5,003,672 A | 4/1991 | Randall |
| D325,546 S | 4/1992 | Collier |
| D329,371 S | 9/1992 | Jou |
| D330,669 S | 11/1992 | Hui-Chuan |
| 5,224,247 A | 7/1993 | Collier |

(Continued)

FOREIGN PATENT DOCUMENTS

EP 1717482 11/2006

*Primary Examiner* — David M Upchurch
(74) *Attorney, Agent, or Firm* — Garvey, Smith & Nehrbass, Patent Attorneys, L.L.C.; Seth M. Nehrbass; Julie R. Chauvin (57) ABSTRACT

Interlocking hook assemblies for straps and cords including a strap member and interlocking hook devices connected to each strap member which can be adjusted to desired length. Each device has apertures fixedly attached to the distal end of the hook body opposite the hook. Each hook device can be connected, preferably in a locking manner, onto the other hook device creating a closed hook assembly thereby disabling the hooks to prevent entanglement of straps. Multiple straps can be connected end-to-end forming an elongated strap of desired length having closed central hooks with open hooks on each end. Interlocking hook assemblies for straps and cords including two similar interlocking hook devices each with a connector groove and dual bar adjustable webbing slider for straps and cords, each said connector groove allows each hook to engage the other within their respective grooves and to releasably lock them together.

20 Claims, 6 Drawing Sheets

(56) References Cited

U.S. PATENT DOCUMENTS

| | | |
|---|---|---|
| D345,297 S | 3/1994 | Kraine |
| 5,638,584 A * | 6/1997 | De Anfrasio ............... B62J 7/08 |
| | | 24/265 H |
| D410,378 S | 6/1999 | Aganian |
| 6,886,796 B1 | 5/2005 | Elander |
| D525,861 S * | 8/2006 | Mackey ......................... D8/367 |
| 7,228,600 B1 * | 6/2007 | Selby ....................... F16B 45/02 |
| | | 24/265 H |
| D546,169 S * | 7/2007 | Selby ............................. D8/367 |
| D559,103 S | 1/2008 | Van Handel et al. |
| 7,603,754 B2 | 10/2009 | Hayes et al. |
| D625,988 S | 10/2010 | Chan |
| 9,051,960 B2 * | 6/2015 | Breeden .................. B65B 13/02 |
| 9,199,571 B2 * | 12/2015 | Leung ................... B60P 7/0823 |
| 9,249,825 B1 * | 2/2016 | Cornay ..................... B60P 7/08 |
| 9,528,655 B1 * | 12/2016 | Miles ..................... B60P 7/0823 |
| 9,610,487 B2 * | 4/2017 | Ahn ....................... A63B 69/38 |
| 9,797,431 B1 | 10/2017 | Cornay |
| 10,174,784 B1 | 1/2019 | Cornay |
| 10,738,820 B1 | 8/2020 | Cornay |
| 2002/0162196 A1 * | 11/2002 | Joubert ................... F16B 45/00 |
| | | 24/300 |
| 2005/0050695 A1 * | 3/2005 | Mackey .................... B62J 7/08 |
| | | 24/300 |
| 2006/0237609 A1 | 10/2006 | Spencer |
| 2007/0067968 A1 | 3/2007 | Krawczyk |
| 2007/0284326 A1 | 12/2007 | Baloun |

\* cited by examiner

INTERLOCKING STRAP HOOKS WITH FLEXIBLE ELONGATED MEMBER ATTACHMENT MEANS

CROSS-REFERENCE TO RELATED APPLICATIONS

This application claims the benefit of my U.S. Provisional Patent Application Ser. No. 62/880,392, filed 30 Jul. 2019, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates primarily to interlocking hooks. More particularly, the present invention relates to interlocking hooks for elastic and rigid tie-down straps.

2. General Background of the Invention

Tie-down strap hooks are manufactured in a variety of different designs of which there are two basic designs, open hook and closed/gated hook (hooks with gates to form a closure). The open hook designs are difficult to store and transport when not in use because the hooks naturally engage upon other objects and become easily entangled especially when several or more elastic or rigid straps are grouped together. The closed or gated hook style utilized in elastic or rigid straps attempts to solve the entanglement problem by providing a hook with a spring loaded gate that is closed when the hook is not in use. However, the spring loaded gate creates difficulty for the user while hooking and unhooking the elastic or rigid strap hook due to interference of the gate in the hook area. Additionally, the gate opens inward into the hook area limiting the available hook area that would otherwise be available if the gate were not present.

See U.S. Pat. Nos. D92,798; D325,546; D329,371; D330,669; D307,705; D345,297; D410,378; D546,169; D559,103; 2,447,422; 4,957,259; 5,003,672; 5,224,247; 6,886,796; 7,228,600; 7,603,754; 9,249,825; 9,797,431; 10,174,784; 10,738,820; Publication No. 2006/0237609; Publication No. 2007/0067968; Publication No. 2007/0284326; and EP 1,717,482A2 and all references cited therein for a background of the invention. All of these references are incorporated herein by reference.

Attempts to solve the problem with elastic or rigid tie-down strap storage are described in U.S. Pat. Nos. 5,003,672; D559,103; 6,886,796 and Publication No. 2007/0284326 and outline methods in which the elastic or rigid strap hook can be covered by a slide-able cover or by means of hooking the elastic or rigid strap to a secondary housing, pallet or frame member to prevent entanglement of the elastic or rigid strap hooks during storage and transportation. Other attempts to solve the problem with elastic or rigid tie-down strap storage and transportation are described in U.S. Pat. Nos. D307,705; D329,371; D330,669; D625,988 and 7,228,600 and outline methods in which elastic or rigid strap hooks are provided with closing gates which are used to disable the hooks when not in use.

An attempt to provide an elastic or rigid strap hook which can be connected end-to-end is described in US Patent Application Publication No. 2007/0067968 wherein the hook is provided with "a receptacle formed in the hook portion for receiving a mating portion of another bungee cord fastener".

BRIEF SUMMARY OF THE INVENTION

The present invention includes a pair of similar hooks with each hook incorporating a connector groove within the hook body and one or more apertures such as a dual bar adjustable webbing slider attached to the hook body opposite the hook. The connector groove allows for the locking engagement of one hook to the other thereby providing a closed hook assembly which will not entangle upon itself or other objects. The aperture on the hook body opposite the hook allows for the connection of an elastic or rigid strap or cord to the aperture. The aperture or apertures can frictionally retain the straps or cords to the hook body. The cords or straps can also be fixedly attached to the aperture or apertures.

The apparatus of the present invention solves the problems confronted in the art in a simple and straightforward manner. The present invention includes a pair of hooks, preferably metal reinforced overmolded plastic hooks, which are preferably provided with a connector groove in the body of the hook having a catch feature which allows for one metal reinforced plastic hook to engage and lock upon the other thereby providing a closed hook assembly which will not engage upon other objects. The interlocking hooks are designed to engage and lock upon one another when not in use to prevent entanglement of elastic or rigid tie-down straps during transportation and storage. Also, the interlocking hooks of the present invention provide a means for the hooks to engage upon one another forming a closed hook assembly when not in use while allowing the entire hook area to remain open and unobstructed for ease of use when attaching to other objects. Additionally, the interlocking hooks of the present invention allow for multiple elastic or rigid tie-down straps to be attached end-to-end offering the user the option to vary the length of the elastic or rigid straps while the central hooks remain interlocked in a closed hook assembly thereby preventing the central hooks from engaging other objects while the hooks on each end remain open for use. The dual bar adjustable webbing slider allows the length of the straps to be independently adjustable to make cords and straps adjustable to desired length.

The interlocking hooks with elastic and rigid cords and straps are advantageous over other elastic and rigid cord and straps with hooks in the following ways:

The present invention is advantageous over other cargo management devices in that it does not require a secondary device to secure and disable the hooks when not in use. Additionally, the present invention allows the hooks of each elastic or rigid tie-down strap to be interlocked, secured and disabled thereby providing the user the option to transport one or multiple tie-down straps to the location which it will be used with their hooks in a secured and safe condition.

The present invention is advantageous over the bungee cord fastener described in US Patent Application Publication No. 2007/0067968 because it does not have a receptacle located in the hook portion which can interfere with the strength and the function of the hook thereby limiting its use.

Additionally, the bungee cord fastener described in US Patent Application Publication No. 2007/0067968 does not provide a means to disable the hooks to prevent engagement of the hooks when being transported or stored when in use or not in use as does the present invention.

Hooks with closing gates are disadvantageous compared to the present invention because the gates interfere with the function of the hooks and make it cumbersome for the user to hook and unhook the elastic or rigid strap due to the requirement to operate the gate while hooking and unhooking the device during operation. The hook engagement capability of the present invention allows for tangle-free transportation and storage of elastic or rigid straps and is advantageous over gated hook styles because the hooks can be interlocked upon one another thereby preventing the hooks from hooking undesirable objects without altering or interfering with the function of the hook when put into use.

Also, the present invention is advantageous over other cargo management devices because the plane of the aperture lies perpendicular to the plane of the hook allowing the strap connected to the aperture to lie flat against the object being retained by the strap.

Figure 9:
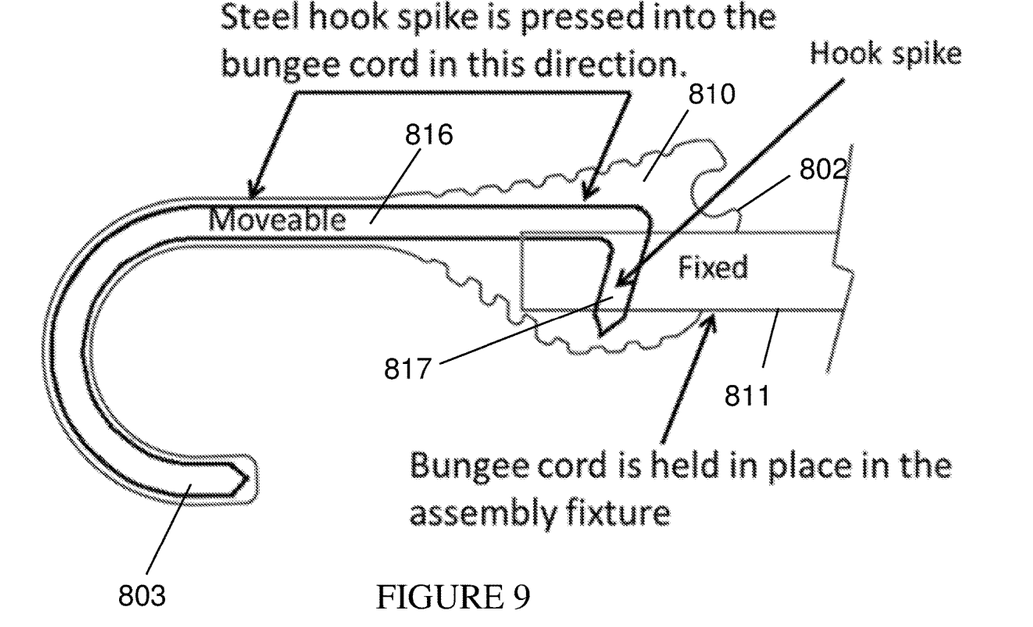
FIG. 9 is a side view cross section of an alternative preferred embodiment of the assembly of the elastic member and interlocking hook assembly as mentioned in my U.S. Pat. Nos. 9,249,825; 9,797,431; 10,174,784; and 10,738,820.

Incorporated herein by reference are my prior U.S. Pat. Nos. 9,249,825; 9,797,431; 10,174,784; and 10,738,820. This is not a continuation or continuation-in-part of these or any related patents. Please see those patents for more information about the structure of the hook member of the present invention. The embodiment shown in FIG. 9 is an alternative assembly of elastic member and interlocking hook assembly of the one shown and described in my U.S. Pat. Nos. 9,249,825; 9,797,431; 10,174,784; and 10,738,820

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Interlocking hook device 100 of the present invention preferably includes hook 101 with hook body 102 preferably having a connector groove 103 and dual bar adjustable webbing slider 104. In various preferred embodiments of the present invention, two similar hook devices 100 can assemble and lock onto one another thereby forming a closed hook assembly, which also disables the hooks 101 and provides for tangle-free transportation and storage when not in use.

Figure 1:
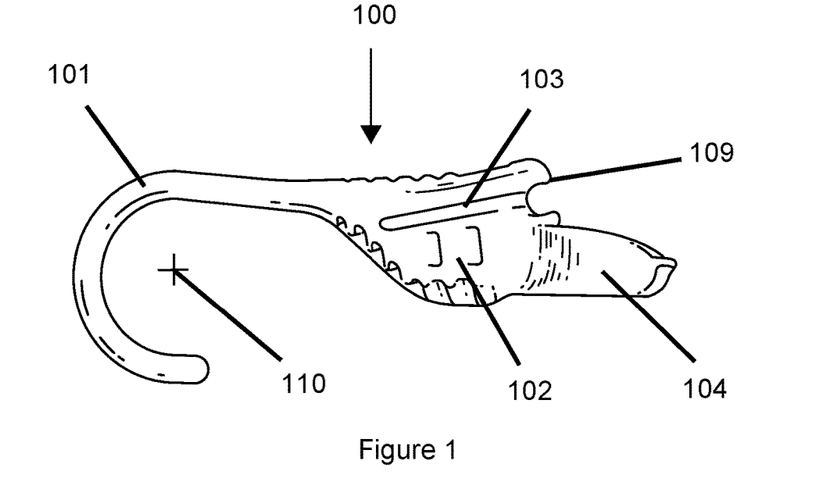
FIG. 1 is a side view of a preferred embodiment of the present invention.

As seen in FIG. 1, interlocking hook device 100 includes hook 101, that has a centroid 110, and is connected to a hook body 102 which is connected to an aperture or apertures of dual bar adjustable webbing slider 104.

Each hook 101 locks into the connector groove 103 of the other hook device 100, preferably frictionally (though they could, for example, be spring or magnetically locked). Each hook 101 preferably frictionally engages the connector groove 103 of the other hook device 100, preferably with catch feature 109.

Figure 2:
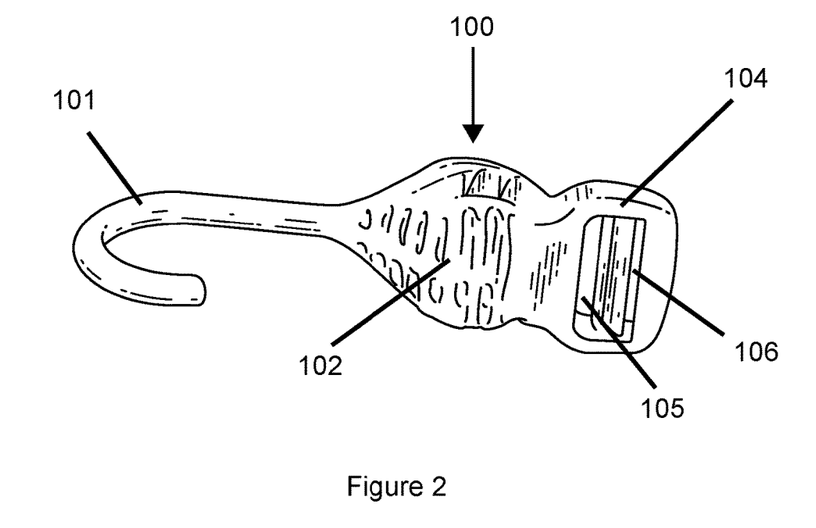
FIG. 2 is an isometric perspective view of the bottom of a preferred embodiment of the present invention.
Figure 7:
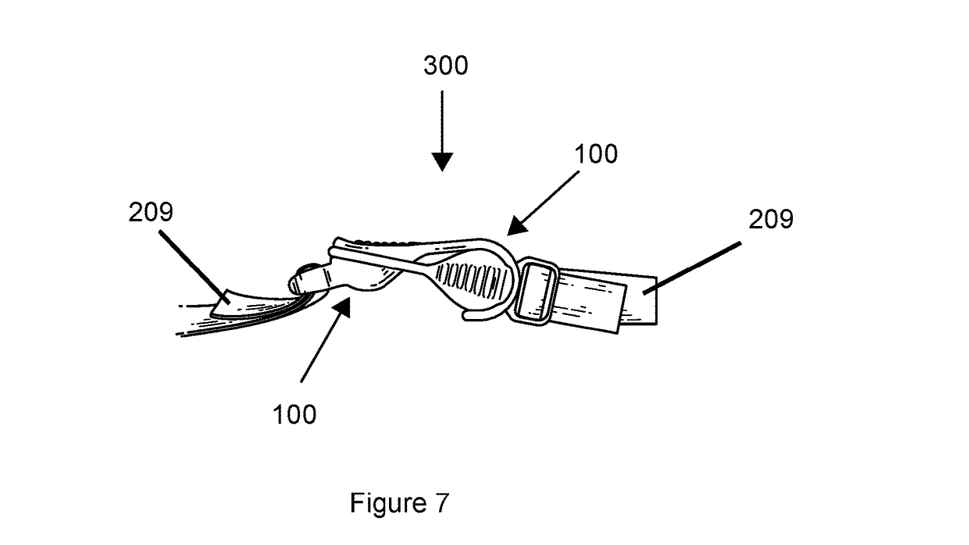
FIG. 7 is an isometric perspective view of a preferred embodiment of the engaged assembly of the present invention.

As seen in FIGS. 1 and 2, in various preferred embodiments of the present invention, interlocking hook device 100 includes hook 101 with hook body 102 which provide the ability for two similar hook devices 100 to assemble and lock onto one another thereby forming a closed hook assembly as shown in FIG. 7. Interlocking hook devices 100 can be connected to an elastomeric or rigid elongated flexible member 209 (see FIG. 5) which provides the ability for the hook devices 100 to assemble onto one another thereby forming a closed hook assembly 300 (see FIG. 7) thereby disabling the hooks 101 and providing for tangle free transportation and storage when not in use.

The size of the preferred embodiments varies depending on the application by which it is used and the amount of stress the hook device is placed under. In various preferred embodiments, hook device 100 is preferably about 1-6 inches in length, more preferably about 3-6 inches in length, and most preferably about 5½ inches in length.

Flexible elongated member/webbing strap 209 can be made of Cotton, Nylon, Polyester & Polypropylene and preferably, in widths of ⅜" to 4". Flexible elongated member 209 can also be made of continuous natural (latex) or synthetic rubber elastic strands with an outer nylon sheath. Flexible elongated member 209 materials include for example Polypropylene, heavy duty nylon, OCE fiber, and EPDM rubber strands. Flexible elongated member 209 can be made of multiple strands or ribbons of natural or synthetic rubber and is prepared and extruded into long ribbons of rubber. These ribbons are approximately 0.09 inch to 0.12 inch (0.24-0.32 cm) thick, 0.25 inch (0.64 cm) wide and up to 100 feet (30 m) long. The number of ribbons, or strands, in a bungee cord determines the diameter of the cord and the overall tensile strength rating. Standard commercial bungee cord is available in diameters from about 0.25-inch to 0.62-inch (0.64-1.6 cm). Mil-spec cord is available from 0.25-inch to 0.87-inch (0.64-2.2 cm) in diameter. Specifications for a 0.62-inch (1.6 cm) diameter mil-spec cord must weigh 14 pounds per 100 feet (or 6 kg per 30 m), support 250-350 pounds (113-159 kg) at 100% elongation, have a minimum breaking strength of 500 pounds (227 kg), and be able to endure a minimum of 50,000 flex cycles.

Interlocking hooks devices 100 and 200 with strap 209 can be assembled by the following preferred method:

Construction of Hook Device 100:

In various preferred embodiments of the present invention, hook device 100 can preferably be constructed of a solid over-molded metal core over-molded with Polypropylene, Polycarbonate, Polyethylene or Nylon. Hook device 100 has a metal core 108 preferably made from high carbon spring wire (preferably music wire ASTM A 228 or hard drawn ASTM A 227). Metal core 108 is formed in the shape of a hook on one end and extends through the hook body 102 and the dual bar adjustable webbing slider 104. An insert molding process is employed by inserting and centralizing the metal core 108 into a first mold cavity in a first half of an injection molding block. The second half of the injection molding block with a second mold cavity is clamped upon the first half of the injection molding block forming one closed cavity in the shape of hook device 100 surrounding metal core 108 within. Polypropylene, polycarbonate, polyethylene or nylon or another thermoplastic polymer is then injected into the two mold cavities thereby completing the inserting molding process and hook device 100.

Figure 3:
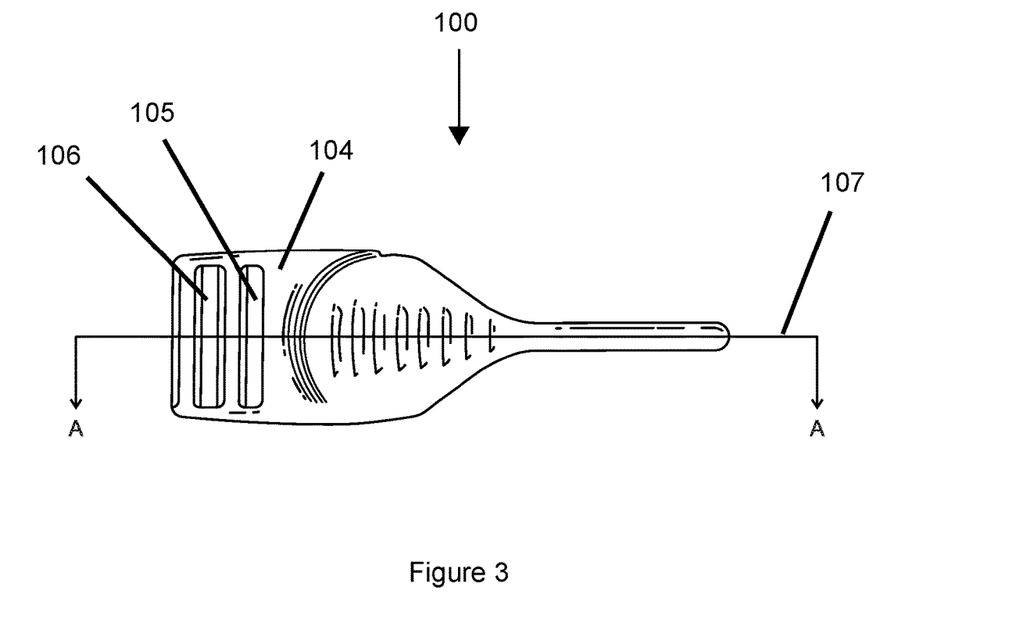
FIG. 3 is a top view of a preferred embodiment of the present invention showing the plane of section A-A.
Figure 4:
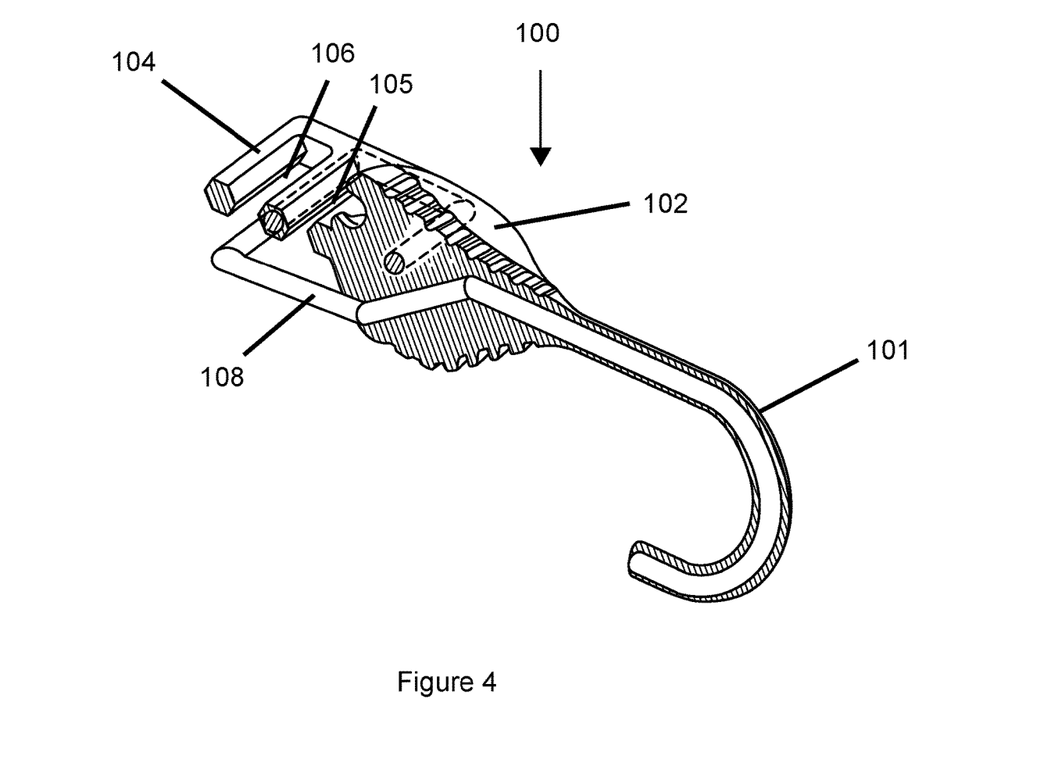
FIG. 4 is an isometric perspective partial cross section view of a preferred embodiment of the present invention.

FIG. 4 shows the A-A cross-section plane 107 of FIG. 3 and shows metal core 108 within hook 101, hook body 102 and dual bar adjustable webbing slider 104 of hook device 100.

Figure 5:
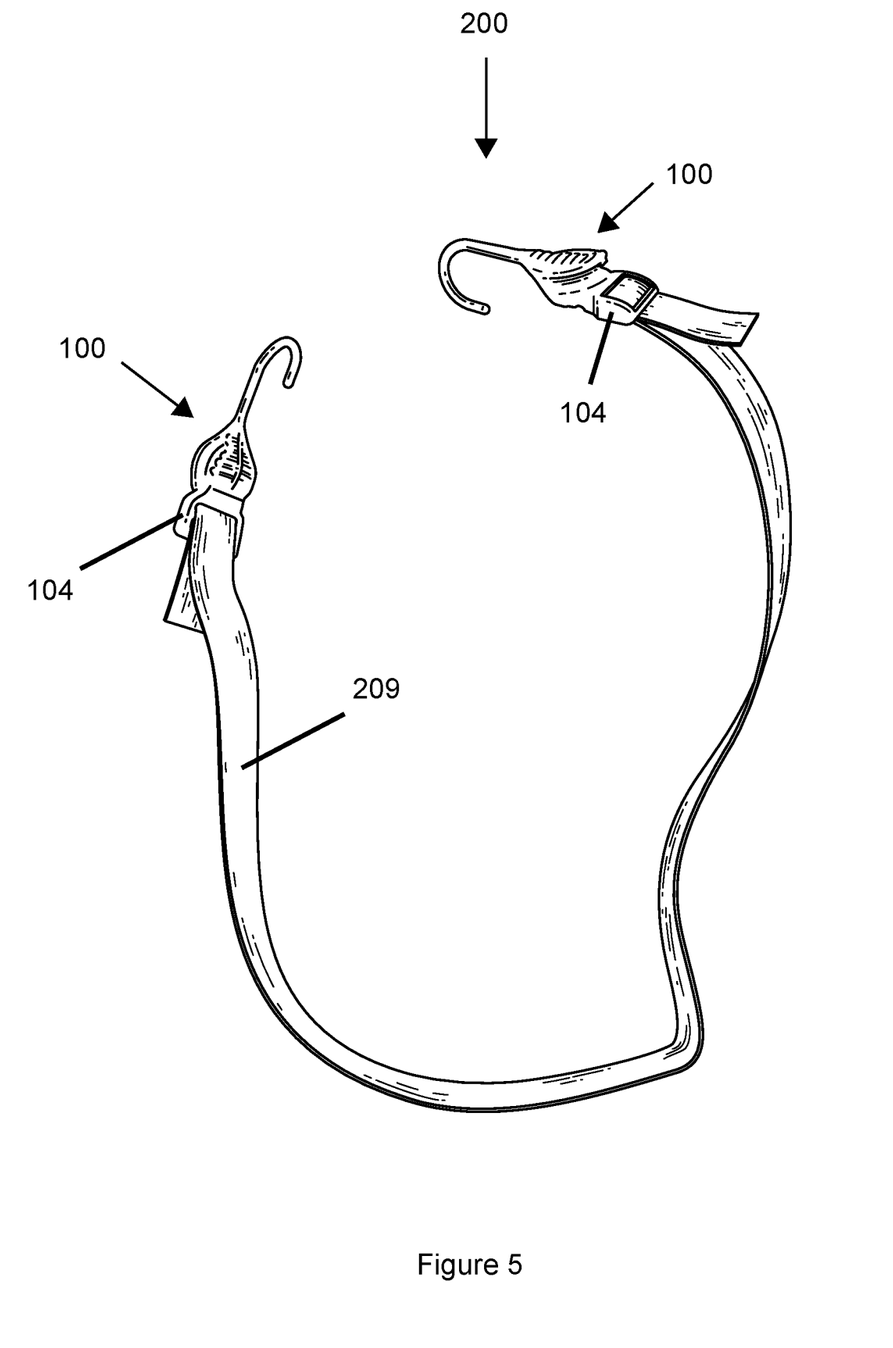
FIG. 5 is an isometric perspective view of a preferred embodiment of the present invention with a strap inserted in the dual bar adjustable webbing slider.
Figure 6:
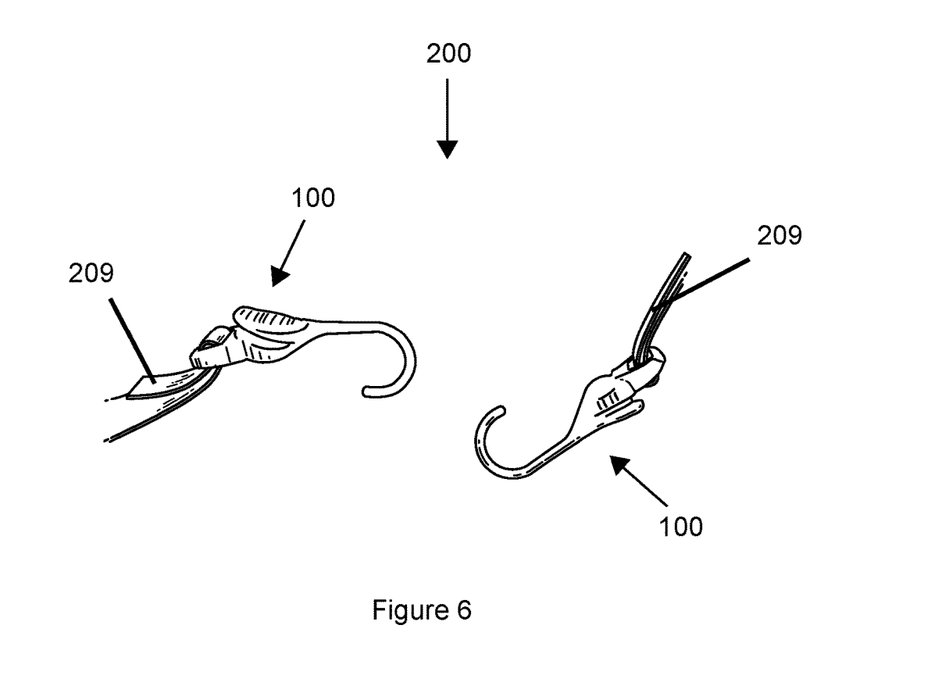
FIG. 6 is an isometric perspective view of a preferred embodiment of the disengaged assembly of the present invention.

Assembly of Hook Device 100 onto Webbing Strap 209:

Webbing strap 209 is passed through the bottom of aperture 105 of dual bar adjustable webbing slider 104 and then through the top of aperture 106 of the dual bar adjustable webbing slider 104 to form the webbing strap 209 and hook device assembly 200. The end of the webbing strap 209 can also be passed through the bottom of aperture 105 and then bonded or sewn onto the webbing strap 209 forming a permanent non-adjustable loop attaching the hook 200 to the webbing strap.

Figure 8:
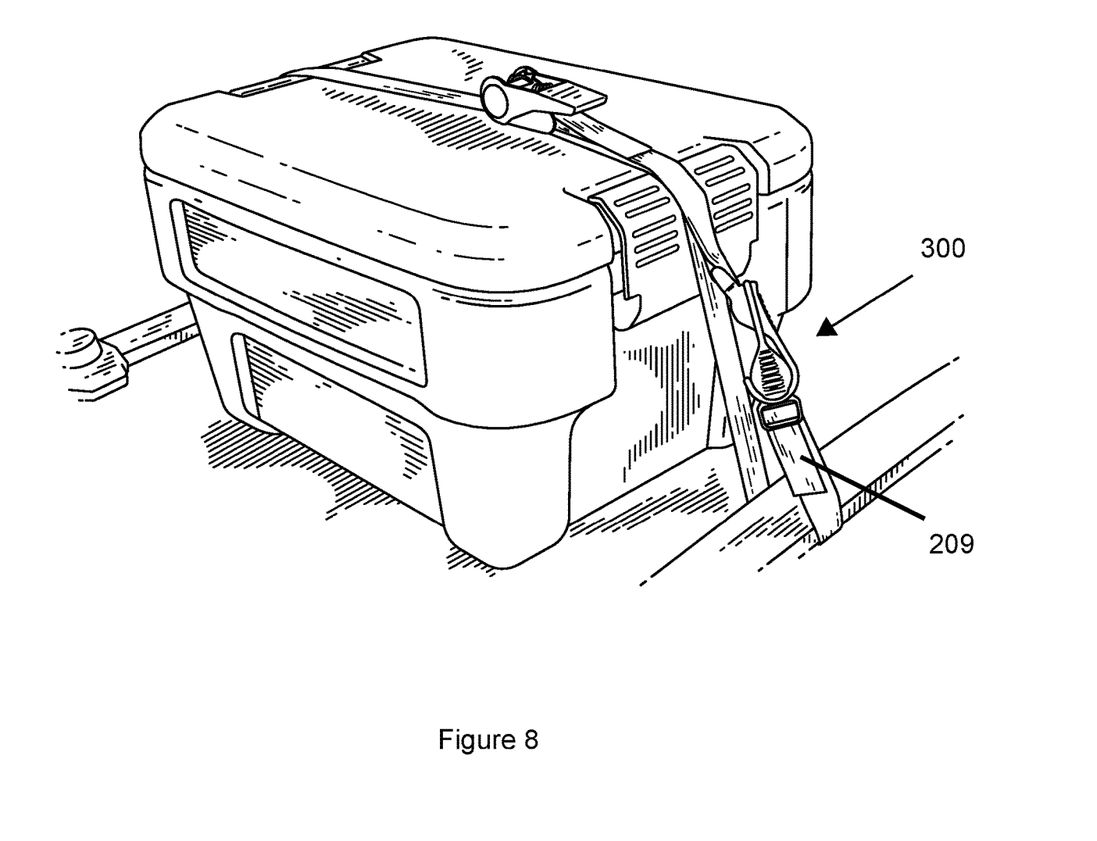
FIG. 8 is an isometric perspective view of a preferred embodiment of the crossed engaged assembly of the present invention in use with a ratchet strap in a cargo management application.

FIGS. 7 and 8 show one hook device 100 engaged and locked with another hook device 100 thereby forming closed hook assembly 300. Assembly 300 will not entangle upon itself or other objects.

FIG. 9 shows an alternative preferred embodiment of the assembly of the elastic member and interlocking hook assembly as shown in FIGS. 22-32, for example, in my U.S. Pat. Nos. 9,249,825; 9,797,431; 10,174,784; and 10,738,820 with elastic member 811 fixedly attached to wire core 803 with hook spike 817. In this alternative preferred embodiment, the J-shaped hook of the hook body has a semicircular portion and a straight portion with a hook spike 817 at the end of the straight portion. Wire core 803 is within a molded thermoplastic hook body.

PARTS LIST

The following is a list of exemplary parts and materials suitable for use in the present invention:

100 Hook device (preferably metal reinforced plastic hook device preferably made of solid over-molded metal core hooks over-molded with Polypropylene, Polycarbonate, Polyethylene or Nylon or another thermoplastic polymer with inner hardened metal core hook preferably made from metal wire or metal formed in the shape of a hook).
101 Hook
102 Hook Body
103 Connector groove
104 Dual bar adjustable webbing slider
105 First aperture of dual bar adjustable webbing slider 104
106 Second aperture of dual bar adjustable webbing slider 104
107 A-A cross section plane
108 Wire core (preferably made of high carbon spring wire (music wire ASTM A 228 or hard drawn ASTM A 227)
109 Catch feature
110 Centroid
200 Hook device (preferably, metal reinforced plastic hook device preferably made of solid over-molded metal core hooks over-molded with Polypropylene, Polycarbonate, Polyethylene or Nylon or another thermoplastic polymer with inner hardened metal core hook made from metal wire or metal formed in the shape of a hook) attached to webbing strap 209
209 Flexible elongated member/webbing strap can be made of Cotton, Nylon, Polyester & Polypropylene and preferably, in widths of ⅜" to 4". Can also be made of Premium latex rubber core, OCE fiber, EPDM (ethylene propylene diene monomer) rubber strands surrounded by woven polyester, nylon or cotton yarn sheath).
300 Closed hook assembly of hooks 100 and straps 209
802 Catch feature
803 Wire core (preferably made of high carbon spring wire (music wire ASTM A 228 or hard drawn ASTM A 227)
810 Hook body
811 Elastic member
816 Shank of hook
817 Hook spike All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An interlocking hook device comprising:
a hook body having two ends and connected to a hook on one end and more than one aperture on the distal end of the hook body opposite the hook, said hook having a centroid; wherein the hook body contains a connector groove which receives a hook of a similar hook device; and wherein the apertures receive an end of a flexible elongated member; and wherein the connector groove has a plane and the plane of the connector groove substantially intersects the centroid of the hook; wherein the apertures have a plane and the plane of the apertures lies substantially perpendicular to the plane of the hook; wherein the plane of the connector groove lies at an acute angle to the plane of the apertures; and wherein the apertures lie outside of the connector groove.

2. The interlocking hook device of claim 1, wherein the hook device is made of solid over-molded metal core over-molded with polypropylene, polycarbonate, polyethylene, or nylon with an inner hardened metal core hook made from metal wire or metal formed in the shape of a hook.

3. The interlocking hook device of claim 1, wherein the said more than one aperture is a dual aperture.

4. The interlocking hook device of claim 2, wherein the apertures are fixedly attached to the hook body by the metal core within the molded hook body that also forms the internal structure of the apertures.

5. The interlocking hook device of claim 1, wherein said hook has a symmetrical plane, and wherein when the connector groove receives the hook of a similar hook device, said hook of said similar hook device having a symmetrical plane, said planes of said hooks lie at about a 90 degree angle.

6. The interlocking hook device of claim 1, wherein said hook has a symmetrical plane, each hook body has an outer surface, and the outer surface of the hook body, the connector groove and the apertures are symmetrical about the symmetrical plane of the hook.

7. The interlocking hook device of claim 1 wherein the connector groove has a cross-sectional area and a catch feature, and wherein said catch feature has a cross-sectional area, and the hook has a cross-sectional area, and the catch feature of the connector groove has a protrusion which partially encloses the circumference of the cross-sectional area of the connector groove wherein the cross-sectional area of the catch feature is smaller than the cross-sectional area of the hook.

8. A flexible elongated member with interlocking hook devices comprising:
a flexible elongated member having first and second ends, with the first end connected to a first hook device and the second end connected to a second hook device, wherein said first hook device has an outer surface and comprises a first hook body,
said first hook body having a hook having a plane and located on one end,
a dual bar adjustable slider having a plane and located on the distal end opposite the hook of said first hook body, wherein said slider can receive said first elongated member end and the plane of said slider lies substantially perpendicular to the plane of the hook,
and an external connector groove, having a plane and a contour, said groove located in between said hook and said slider on the outer surface of the first hook device, and wherein the plane of said connector groove lies at an acute angle to the plane of the slider; wherein said second hook device has an outer surface and comprises a second hook body, said second hook body having
a hook having a plane located on one end of said second hook body,
a dual bar adjustable slider having a plane located on the other distal end of said second hook body, wherein said second hook body slider can receive said second elongated member end and the plane of said second hook body slider lies substantially perpendicular to the plane of the hook of said second hook body,
and an external connector groove, having a plane and a contour, said groove located in between said hook and said slider on the outer surface of the second hook device, and wherein the plane of said connector groove lies at an angle acute to the plane of the slider of said second hook body; and
wherein said first hook device and said second hook device can engage by inserting the hook of said first hook device into the contour of the connector groove of said second hook device and by inserting the hook of said second hook device into the contour of the connector groove of said first hook device, thereby forming a closed hook assembly and a closed loop of the flexible elongated member, and wherein the plane of the slider of the first hook body lies perpendicular to the plane of the slider of the second hook body.

9. The flexible elongated member with interlocking hook devices of claim 8, wherein said external connector groove contour of said first hook body is sized and shaped to accommodate a hook of a said hook body.

10. The flexible elongated member with interlocking hook devices of claim 9, wherein said external connector groove contour of said second hook body is sized and shaped to accommodate a hook of a said hook body.

11. The flexible elongated member with interlocking hook devices of claim 8, wherein the hook of said first hook body has a centroid and the plane of the connector groove of said first hook body substantially intersects the centroid of the hook of said first hook body.

12. The flexible elongated member with interlocking hook devices of claim 8, wherein the flexible elongated member has an axis, and the hook has a shank which is substantially parallel to the axis of the flexible elongated member.

13. The flexible elongated member with interlocking hook devices of claim 8, wherein the flexible elongated member is a bungee strap or rigid strap webbing.

14. The flexible elongated member with interlocking hook devices of claim 8, wherein the flexible elongated member has an axis, each said connector groove has a center, and said axis does not pass through the center of the connector groove of said first hook device or through the center of the connector groove of said second hook device.

15. The flexible elongated member with interlocking hook devices of claim 8, wherein the flexible elongated member has an axis and the plane of each said connector groove lies at an acute angle to the axis of the flexible elongated member.

16. An interlocking device comprising:
a flexible elongated member having first and second ends, with the first end connected to a first hook device and the second end connected to a second hook device, wherein said first hook device comprises:
a hook having a plane and located on one end,
a dual bar adjustable slider having a plane and located on the end opposite said hook, wherein said a dual bar adjustable slider includes a dual aperture that receives said first elongated member end and the plane of said dual aperture and said dual bar adjustable slider lies substantially perpendicular to the plane of said hook, and
an external connector groove located in between said hook and said dual aperture of the first hook device;
wherein said second hook device comprises:
a hook having a plane located on one end of said second hook device,
a dual bar adjustable slider having a plane located on the end opposite of the hook of said second hook device, wherein said dual bar adjustable slider of said second hook device includes a dual aperture that can receive said second elongated member end and the plane of said dual aperture of the second hook device lies substantially perpendicular to the plane of the hook of said second hook device, and
an external connector groove located in between said hook and said dual aperture of said second hook device; and
wherein said first hook device and said second hook device can interlock by inserting the hook of said first hook device into the connector groove of said second hook device and by inserting the hook of said second hook device into the connector groove of said first hook device, thereby forming a closed assembly, and wherein the plane of the dual aperture of the first hook device lies perpendicular to the plane of the dual aperture of the second hook device.

17. The interlocking device of claim 16, wherein said external connector groove of said first hook device has a plane and wherein the external connector groove of said second hook device has a plane that lies substantially perpendicular to the plane of the first hook device.

18. The interlocking device of claim 16, wherein the connector groove of said first hook device has a catch feature and the connector groove of said second hook device has a catch feature,
   wherein each said catch feature includes a protrusion and flexes that allow the hook of said first hook device to pass through the catch feature of the connector groove of said second hook device and the hook of said second hook device to pass through the catch feature of the connector groove of said first hook device, thereby creating a snap-locking engagement.

19. The interlocking device of claim 18, wherein each said hook has a centroid, and wherein the plane of each said hook is symmetrical and the plane of each said connector groove is symmetrical, and wherein the plane of the connector groove of said first hook device lies at an angle of about 90 degrees to the plane of the hook of said first hook device, and the plane of the connector groove of said second hook device lies at an angle of about 90 degrees to the plane of the hook of said second hook device.

20. The interlocking hook device of claim 18, wherein the catch feature has a center, the flexible elongated member has an axis, and the axis of the flexible elongated member does not intersect the center of the catch feature.

* * * * *